US012783031B2

(12) United States Patent
Liu

(10) Patent No.: US 12,783,031 B2
(45) Date of Patent: Nov. 3, 2026

(54) SERVER POWER SUPPLYING METHOD AND SYSTEM, DEVICE, AND MEDIUM

(71) Applicant: SUZHOU METABRAIN INTELLIGENT TECHNOLOGY CO., LTD., Suzhou (CN)

(72) Inventor: Yuantao Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 138 days.

(21) Appl. No.: 18/850,027

(22) PCT Filed: Jun. 15, 2023

(86) PCT No.: PCT/CN2023/100510
§ 371 (c)(1),
(2) Date: Sep. 23, 2024

(87) PCT Pub. No.: WO2024/051254
PCT Pub. Date: Mar. 14, 2024

(65) Prior Publication Data

US 2025/0208678 A1 Jun. 26, 2025

(30) Foreign Application Priority Data

Sep. 5, 2022 (CN) ......................... 202211077462.4

(51) Int. Cl.
*G06F 1/26* (2006.01)
*G06F 1/18* (2026.01)

(52) U.S. Cl.
CPC .............. *G06F 1/263* (2013.01); *G06F 1/189* (2013.01); *G06F 1/26* (2013.01)

(58) Field of Classification Search
CPC . G06F 1/189; G06F 1/26; G06F 1/263; Y02D 10/00
See application file for complete search history.

(56) References Cited

U.S. PATENT DOCUMENTS 11,622,468 B1 * 4/2023 Welsko ................ H05K 5/0256 165/200
2006/0242462 A1 10/2006 Kasprzak et al.
(Continued)

FOREIGN PATENT DOCUMENTS

CN 109889030 A 6/2019
CN 109992082 A 7/2019
(Continued)

OTHER PUBLICATIONS

EP23861957.1 extended European search report dated Jul. 15, 2025.

*Primary Examiner* — Terrell S Johnson
(74) *Attorney, Agent, or Firm* — IPro, PLLC

(57) ABSTRACT

A server power supplying method and system, a device, and a medium are provided by the present application, the method includes: connecting a first device in a server system based on a first power supply, and connecting a second device in the server system based on a second power supply, wherein the first power supply and the second power supply are electric power supplies of the server system; after the server system is powered on, acquiring power supply information of the server system and determining the power supply information; in response to the power supply information being first power supply information, configuring a power supply enable signal of the first power supply to enable the first power supply to supply power to the first device in the server system.

17 Claims, 5 Drawing Sheets

(56) References Cited

U.S. PATENT DOCUMENTS

| | | | | |
|---|---|---|---|---|
| 2014/0359331 | A1* | 12/2014 | Kuan | G06F 1/263 713/323 |
| 2017/0336844 | A1* | 11/2017 | Koga | G06F 1/20 |
| 2023/0035591 | A1* | 2/2023 | Ozawa | B60L 55/00 |

FOREIGN PATENT DOCUMENTS

| | | | |
|---|---|---|---|
| CN | 209265383 | U | 8/2019 |
| CN | 110515442 | A | 11/2019 |
| CN | 110994973 | A | 4/2020 |
| CN | 111966200 | A | 11/2020 |
| CN | 112054664 | A | 12/2020 |
| CN | 110429577 | B | 8/2021 |
| CN | 114155888 | A | 3/2022 |
| CN | 217335429 | U | 8/2022 |
| CN | 115167647 | A | 10/2022 |
| CN | 115220560 | A | 10/2022 |

* cited by examiner

SERVER POWER SUPPLYING METHOD AND SYSTEM, DEVICE, AND MEDIUM

CROSS-REFERENCE TO RELATED APPLICATION

This application claims the priority of the Chinese Patent application filed on Sep. 5, 2022 before the China National Intellectual Property Administration with the application number of 202211077462.4, and the title of "SERVER POWER SUPPLYING METHOD AND SYSTEM, DEVICE, AND MEDIUM", which is incorporated herein in its entirety by reference.

FIELD

The present application relates to the technical field of servers and, more particularly, to a server power supplying method and system, a device, and a medium.

BACKGROUND

With the development of cloud computing applications, informatization has gradually permeated all sectors of society. People's daily work and life increasingly rely on the Internet for communication, resulting in a continuous increase in the volume of network data. For traditional data center rooms, in order to avoid the enormous investment required for rebuilding data centers and to meet the growing demand for information services, the requirements for servers are also increasing. People also require servers to operate continuously for 24 hours to satisfy the ever-growing business demands.

At the same time, in order to meet the growing market demand and cover different application scenarios, existing servers has been added numerous graphics processing unit (GPU) configurations. The power supplying methods for the GPU configurations have become a hot topic of discussion.

Currently, in order to meet different application scenarios, the server system has been added numerous models with the GPU configurations. Since most GPUs are powered by 54 V power supplies, while other system components, such as hard drives, peripheral component interconnect express (PCIe) devices, and motherboards, are powered based on 12 V power supplies. This necessitates the use of a 54 V output power supply unit (PSU) to supply power to the entire system, requiring the conversion of a 54 V voltage to a 12 V voltage at the system end for distribution to other components. In this process, certain conversion efficiency and conversion circuitry are existed, costs are increased, and power supplying efficiency is reduced. Accordingly, power consumption for the system is increased. In the related art, a significant disadvantage that the power supplying mode utilizes a 54 V power supply combined with a 12 V conversion module is that the efficiency (overall efficiency=54 V power supplying efficiency*12 V conversion module efficiency) is low. Another significant disadvantage is that the 12 V conversion module is embedded within the system and is a part of the motherboard. If the conversion module is damaged, the system may be shut down and opened for maintenance, replacement is difficult and maintenance costs are high.

SUMMARY

In view of this, a server power supplying method and system, a device, and a medium are provided by the present application. Two types of PSUs, which are 12 V and 54 V, are used to supply power to the server system, and a hybrid power supplying mode is used to improve the overall efficiency, the power supplying efficiency is equal to the individual efficiency of each PSU. Moreover, mechanical foolproof and electrical foolproof are also added in the whole power supplying solution, which prevents the problem of mixed insertion of 12 V power supply and 54 V power supply. In addition, the power-on sequence is also strictly controlled in the power supplying solution, that is, giving priority to 54 V output followed by 12 V output, to solve the voltage overshoot caused by the simultaneous power-on of the two power supplies, and realize the time-sharing power-on of the server system.

Based on the above object, a server power supplying method is provided in an aspect of the embodiments of the present application, which includes the following steps:

- connecting a first device in a server system based on a first power supply, and connecting a second device in the server system based on a second power supply, wherein the first power supply and the second power supply are electric power supplies of the server system;
- after the server system is powered on, acquiring power supply information of the server system and determining the power supply information;
- in response to the power supply information being first power supply information, configuring a power supply enable signal of the first power supply to enable the first power supply to supply power to the first device in the server system based on the power supply enable signal of the first power supply; and
- in response to the power supply information being second power supply information, configuring a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply.

In some implementations, the configuring the power supply enable signal of the first power supply includes:

- configuring the power supply enable signal of the first power supply to be active low; and
- as opposed to the configuring the power supply enable signal of the first power supply to be active low; the configuring the power supply enable signal of the second power supply includes: configuring the power supply enable signal of the second power supply to be active high.

In some implementations, the server power supplying method further includes:

- enabling the power supply enable signal of the second power supply based on a complex programmable logic device to enable the second power supply to output a second voltage; and
- after the second power supply outputs the second voltage for a preset time, enabling the power supply enable signal of the first power supply based on a metal-oxide-semiconductor field-effect transistor to enable the first power supply to output a first voltage.

In some implementations, the enabling the power supply enable signal of the second power supply based on the complex programmable logic device includes:

outputting a high level to the second power supply based on the complex programmable logic device to enable the power supply enable signal of the second power supply.

In some implementations, the enabling the power supply enable signal of the first power supply based on the metal-oxide-semiconductor field-effect transistor includes:

obtaining a third voltage by dividing the second voltage; and regarding the third voltage as an enable signal of the metal-oxide-semiconductor field-effect transistor to enable the metal-oxide-semiconductor field-effect transistor to output a low level to the first power supply to enable the power supply enable signal of the first power supply.

In some implementations, the first power supply is a power supply with an output voltage of 12 V, the second power supply is a power supply with an output voltage of 54 V, the first voltage is 12 V, the second voltage is 54 V, and the third voltage is 3.3 V.

In some implementations, the server power supplying method further includes:

adding a first foolproof slot to a housing of the first power supply, and adding a first foolproof column corresponding to the first foolproof slot to a server chassis.

In some implementations, the server power supplying method further includes:

adding a second foolproof slot to a housing of the second power supply, and adding a second foolproof column corresponding to the second foolproof slot to the server chassis.

In some implementations, the configuring the power supply enable signal of the first power supply includes:

configuring the power supply enable signal of the first power supply to be active high; and as opposed to the configuring the power supply enable signal of the first power supply to be active high, the configuring the power supply enable signal of the second power supply includes: configuring the power supply enable signal of the second power supply to be active low.

In some implementations, the server power supplying method further includes:

connecting each of the first power supply and the second power supply to a corresponding server card through a connector.

In some implementations, the second device includes a graphics processing unit; and the first device includes at least one of a central processing unit, a baseboard management controller and a memory.

In another aspect of the embodiments of the present application, a server power supplying system is further provided, which includes:

a connection module configured to connect a first device in a server system based on a first power supply and connect a second device in the server system based on a second power supply, wherein the first power supply and the second power supply are electric power supplies of the server system;

a determination module configured to after the server system is powered on, acquire power supply information of the server system and determine the power supply information; and a power supplying module configured to in response to the power supply information being first power supply information, configure a power supply enable signal of the first power supply to enable the first power supply to supply power to the first device in the server system based on the power supply enable signal of the first power supply;

the power supplying module being further configured to in response to the power supply information being second power supply information, configure a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply.

In some implementations, the server power supplying system further includes a timing control module, the timing control module is configured to:

enable the power supply enable signal of the second power supply based on a complex programmable logic device to enable the second power supply to output a second voltage; and after the second power supply outputs the second voltage for a preset time, enable the power supply enable signal of the first power supply based on a metal-oxide-semiconductor field-effect transistor to enable the first power supply to output a first voltage.

In yet another aspect of the embodiments of the present application, a computer device is further provided, including: at least one processor: and a memory storing computer programs executable on each of the at least one processor, wherein each of the at least one processor, when executing the computer programs, performs steps of the following method:

connecting a first device in a server system based on a first power supply, and connecting a second device in the server system based on a second power supply, wherein the first power supply and the second power supply are electric power supplies of the server system;

after the server system is powered on, acquiring power supply information of the server system and determining the power supply information;

in response to the power supply information being first power supply information, configuring a power supply enable signal of the first power supply to enable the first power supply to supply power to the first device in the server system based on the power supply enable signal of the first power supply; and in response to the power supply information being second power supply information, configuring a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply.

In some implementations, the configuring the power supply enable signal of the first power supply includes:

configuring the power supply enable signal of the first power supply to be active low; and as opposed to the configuring the power supply enable signal of the first power supply to be active low, the configuring the power supply enable signal of the second power supply includes: configuring the power supply enable signal of the second power supply to be active high.

In some implementations, the server power supplying method further includes:

enabling the power supply enable signal of the second power supply based on a complex programmable logic device to enable the second power supply to output a second voltage; and after the second power supply outputs the second voltage for a preset time, enabling the power supply enable signal of the first power supply based on a metal-oxide-semiconductor field-effect transistor to enable the first power supply to output a first voltage.

In some implementations, the enabling the power supply enable signal of the second power supply based on the complex programmable logic device includes:

outputting a high level to the second power supply based on the complex programmable logic device to enable the power supply enable signal of the second power supply.

In some implementations, the enabling the power supply enable signal of the first power supply based on the metal-oxide-semiconductor field-effect transistor includes:

obtaining a third voltage by dividing the second voltage; and regarding the third voltage as an enable signal of the metal-oxide-semiconductor field-effect transistor to enable the metal-oxide-semiconductor field-effect transistor to output a low level to the first power supply to enable the power supply enable signal of the first power supply.

In some implementations, the first power supply is a power supply with an output voltage of 12 V, the second power supply is a power supply with an output voltage of 54 V, the first voltage is 12 V, the second voltage is 54 V, and the third voltage is 3.3 V.

In some implementations, the server power supplying method further includes:

adding a first foolproof slot to a housing of the first power supply, and adding a first foolproof column corresponding to the first foolproof slot to a server chassis.

In some implementations, the server power supplying method further includes:

adding a second foolproof slot to a housing of the second power supply, and adding a second foolproof column corresponding to the second foolproof slot to the server chassis.

In some implementations, the configuring the power supply enable signal of the first power supply includes:

configuring the power supply enable signal of the first power supply to be active high; and as opposed to the configuring the power supply enable signal of the first power supply to be active high, the configuring the power supply enable signal of the second power supply includes: configuring the power supply enable signal of the second power supply to be active low:

In some implementations, the server power supplying method further includes:

connecting each of the first power supply and the second power supply to a corresponding server card through a connector.

In some implementations, the second device includes a graphics processing unit; and the first device includes at least one of a central processing unit, a baseboard management controller and a memory.

In a further aspect of embodiments of the present application, a computer non-transitory readable storage medium is further provided, the computer non-transitory readable storage medium stores computer programs, wherein when the computer program are executed by a processor, the steps of the server power supplying method stated above are implemented.

The present application has at least the following beneficial technical effects: two types of PSUs, which are 12 V and 54 V, are used to supply power to the server system, and a hybrid power supplying mode is used to improve the overall efficiency, the power supplying efficiency is equal to the individual efficiency of each PSU. Moreover, mechanical foolproof and electrical foolproof are also added in the whole power supplying solution, which prevents the problem of mixed insertion of the 12 V power supply and the 54 V power supply. In addition, the power-on sequence is also strictly controlled in the power supplying solution, that is, giving priority to 54 V output followed by 12 V output, to solve the voltage overshoot caused by the simultaneous power-on of the two power supplies, and realize the time-sharing power-on of the server system.

BRIEF DESCRIPTION OF THE DRAWINGS

In order to illustrate the technical solutions in the embodiments of the present application or in the related art more clearly, a brief description will be given below with reference to the drawings which are needed to be used in the description of the embodiments or the related art, and it is obvious that the drawings in the description below are merely some embodiments of the present application, and a person skilled in the art may also obtain other embodiments according to these drawings without involving any creative efforts.

DETAILED DESCRIPTION

Figure 1:
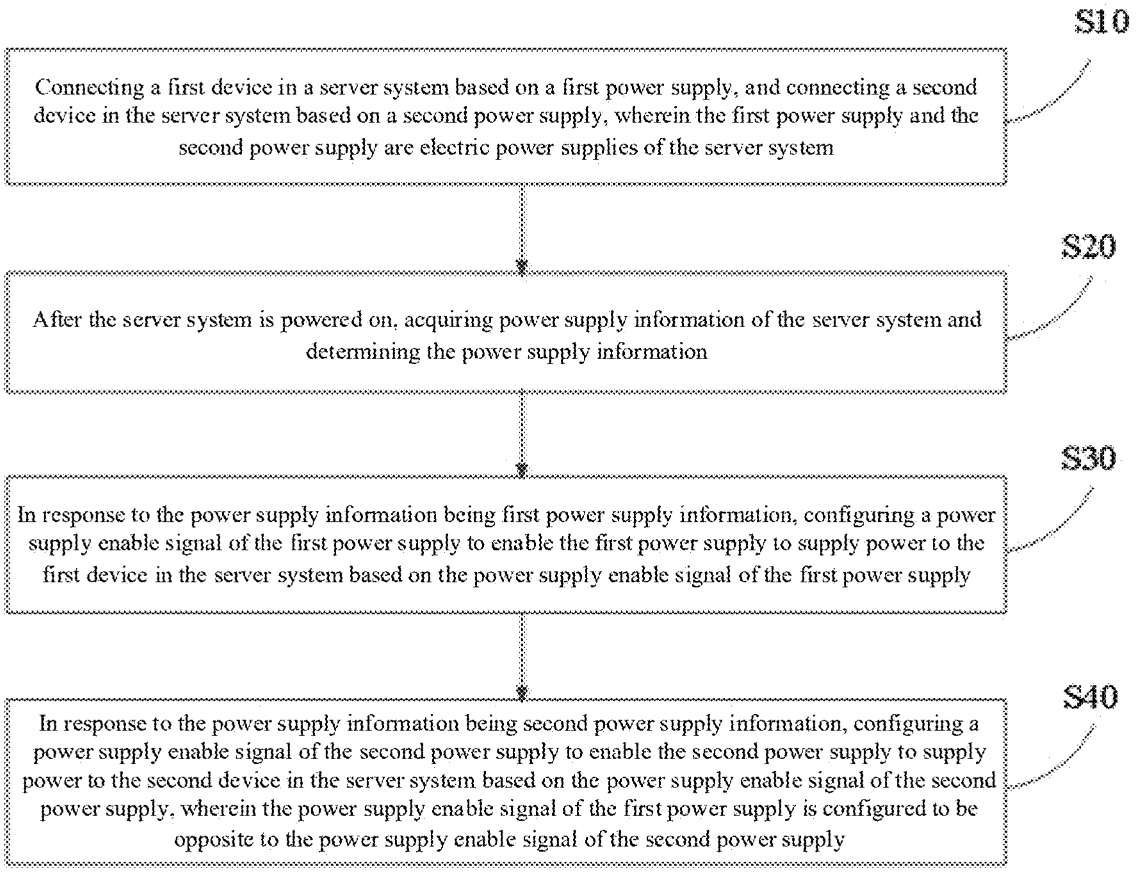
FIG. 1 is a flowchart of an embodiment of a server power supplying method according to the present application.

In order to make the object, technical solution, and advantages of the present application clearer, the embodiments of the present application are further detailed below in combination with embodiments and referring to the drawings.

It should be noted that all the expressions using "first" and "second" in the embodiments of the present application are used for distinguishing two different entities or parameters with the same name. It may be seen that "first" and "second" are for the convenience of expressions and should not be understood as limiting the embodiments of the present application, and the subsequent embodiments will not be illustrated one by one.

Based on the above object, in a first aspect of an embodiment of the present application, embodiments of a server power supplying method are provided. As shown in FIG. 1, the method includes the following steps:

S10: connecting a first device in a server system based on a first power supply, and connecting a second device in the server system based on a second power supply, wherein the first power supply and the second power supply are electric power supplies of the server system.

S20: after the server system is powered on, acquiring power supply information of the server system and determining the power supply information.

S30: in response to the power supply information being first power supply information, configuring a power supply enable signal of the first power supply to enable the first power supply to supply power to the first device in the server system based on the power supply enable signal of the first power supply.

S40: in response to the power supply information being second power supply information, configuring a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply.

The first power supply and the second power supply are electric power supplies of the server system. After the server system is plugged into the mains power, the hardware devices on the server system are supplied with power via the first power supply and the second power supply. The first power supply and the second power supply are power supplies providing different output voltages. One or more first power supplies and second power supplies may be configured according to the power requirements of the server system and the power supplying requirements of the hardware devices mounted on the server system; for example, the first power supply is a 12 V power supply for supplying power to the devices requiring 12 V power-supplying in the server system, wherein the devices requiring 12 V power-supplying include a central processing unit (CPU), a baseboard management controller (BMC), a hard disk, and the like; and the second power supply is a 54 V power supply for supplying power to the devices requiring 54 V power-supplying in the server system, wherein the device requiring 54 V power supplying includes a graphics processing unit (GPU).

In order to prevent the power supplies with different power supplying voltage types from being mixed, after the server system is powered on, power supply information of the server system is read and the power supply information is determined; and the power supply enable signal of each determined type of the power supplies is configured, for example, the power supply enable signal of the first power supply is configured to be active low and correspondingly the power supply enable signal of the second power supply is configured to be active high, or the power supply enable signal of the first power supply is configured to be active high and correspondingly the power supply enable signal of the second power supply is configured to be active low.

In the above solution, devices with different power supplying requirements in the server system are supplied with power via the first power supply and the second power supply. After the server is powered on, the power supply information is identified, and the power supply enable signal of the first power supply and the power supply enable signal of the second power supply are correspondingly configured based on the identified power supply information, so that respective corresponding devices are supplied with power by the first power supply and the second power supply under the condition that the respective enable signals are valid, thereby hybrid power supplying of the two power supplies in the server system is achieved, the power supplying efficiency of the server system is improved, and the electrical foolproof of the server system is realized by configuring the power supply enable signals of the two power supplies.

In some implementations, the configuring the power supply enable signal of the first power supply includes:

configuring the power supply enable signal of the first power supply to be active low; and as opposed to the configuring the power supply enable signal of the first power supply to be active low, the configuring the power supply enable signal of the second power supply includes: configuring the power supply enable signal of the second power supply to be active high.

Figure 2:
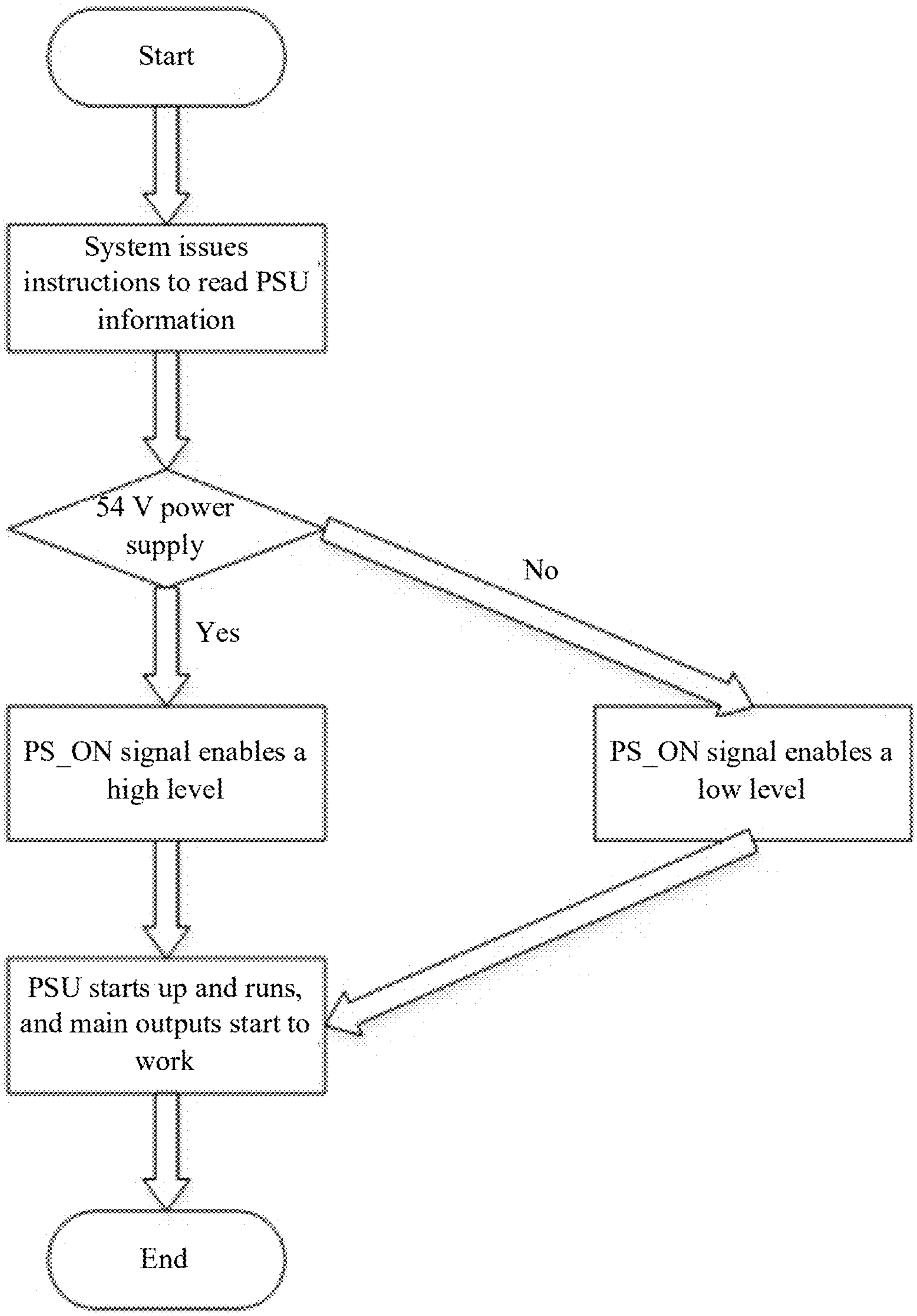
FIG. 2 is a flowchart of an embodiment of configuring a power supply enable signal according to the present application.

As shown in FIG. 2, in order to avoid the mixed insertion problem of different types of power supplies in the server system or the phenomenon of mixed insertion in the bare board testing, which results in board burning problems, in the present embodiment, the output of the power supply on the gold finger of the power supply or the connector is limited, and the enable pin is added. The details are as follows: a pin is selected at the gold finger end; the PS_ON signal of the pin is used as the power supply enable signal, and the default configuration is that the main output of the power supply starts to output when the PS_ON is pulled low. When the server system end identifies whether the power supply is a 54 V power supply or a 12 V power supply via a power management bus (PMBus), a corresponding power supply is matched and then a signal is enabled, for example, the PS_ON of 12 V power supply is configured to be active low, and the PS_ON of the 54 V power supply is configured to be active high; based on this, a mixed insertion problem of the power supplies is effectively prevented, and the electrical foolproof is realized.

In the above solution, two types of PSUs, which are 12 V and 54 V, are used to supply power to the server system, and a hybrid power supplying mode is used to improve the overall efficiency, the power supplying efficiency is equal to the individual efficiency of each PSU. Moreover, mechanical foolproof and electrical foolproof are also added in the whole power supplying solution, which prevents the problem of mixed insertion of the 12 V power supply and the 54 V power supply.

In some implementations, the server power supplying method further includes:

enabling the power supply enable signal of the second power supply based on a complex programmable logic device to enable the second power supply to output a second voltage; and after the second power supply outputs the second voltage for a preset time, enabling the power supply enable signal of the first power supply based on a metal-oxide-semiconductor field-effect transistor to enable the first power supply to output a first voltage.

In some implementations, the enabling the power supply enable signal of the second power supply based on the complex programmable logic device includes:

outputting a high level to the second power supply based on the complex programmable logic device to enable the power supply enable signal of the second power supply.

In some implementations, the enabling the power supply enable signal of the first power supply based on the metal-oxide-semiconductor field-effect transistor includes:

obtaining a third voltage by dividing the second voltage; and regarding the third voltage as an enable signal of the metal-oxide-semiconductor field-effect transistor to enable the metal-oxide-semiconductor field-effect transistor to output a low level to the first power supply to enable the power supply enable signal of the first power supply.

Figure 3:
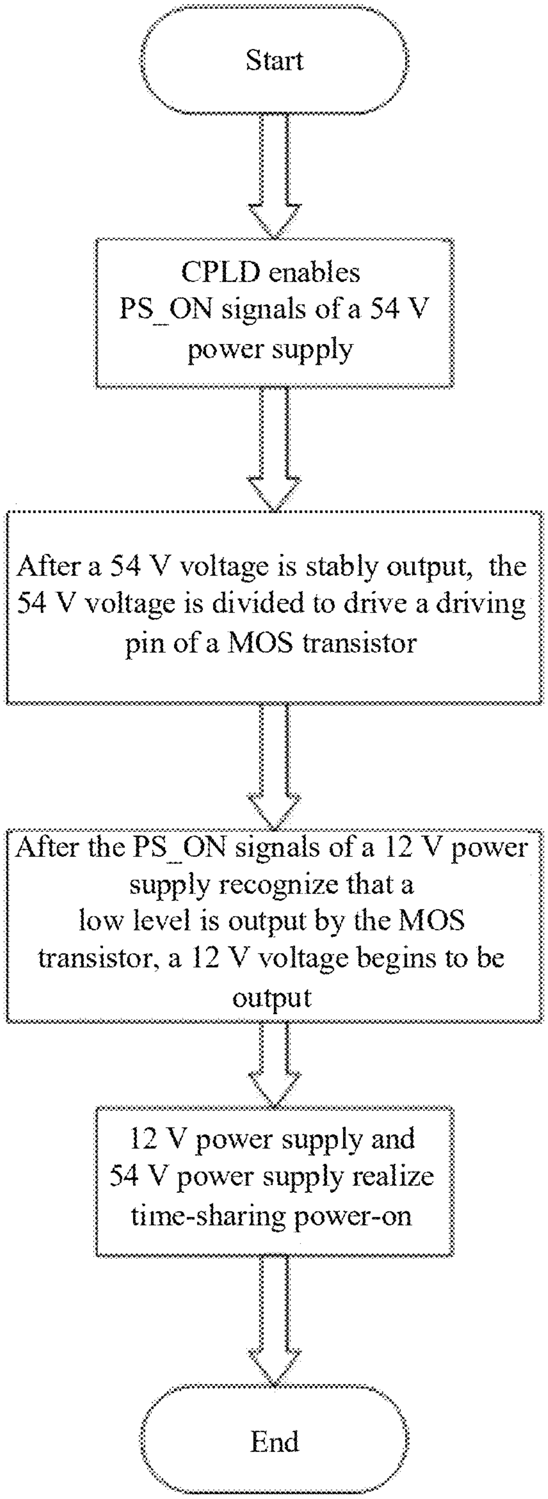
FIG. 3 is a flowchart of an embodiment of controlling power-on sequence of power supplies according to the present application.

A solution is provided by the present embodiment, the power-on sequence may be strictly controlled, assuming that the server system needs to preferentially output the 54 V voltage and then output the 12 V voltage, as shown in FIG. 3, which is a time-sharing power-on flowchart. The process is as follows.

A PS_ON signal of 54 V is enabled through a complex programmable logic device (CPLD), namely, the CPLD pulls up the PS_ON signal so that the 54 V power supply outputs the 54 V voltage, and when the 54 V voltage continues to output stably, the 54 V voltage is divided to a 3.3 V level as an enable signal to drive a driving pin of the metal-oxide-semiconductor field-effect transistor, a low level is output and given to a PS_ON pin of a 12 V power supply, serving as a power-up signal of the 12 V power supply. In this way, the priority output of the 54 V power supply is realized, the 12 V power supply is output after stabilization, the time-sharing power-on is realized and the voltage overshoot caused by the simultaneous power-on of different power supplies is also solved.

In the above solution, two types of PSUs, which are 12 V and 54 V, are used to supply power to the server system, and a hybrid power supplying mode is used to improve the overall efficiency, the power supplying efficiency is equal to the individual efficiency of each PSU. Moreover, the power-on sequence is also strictly controlled in the power supplying solution, that is, giving priority to 54 V output followed by 12 V output, to solve the voltage overshoot caused by the simultaneous power-on of the two power supplies, and realize the time-sharing power-on of the server system.

In some implementations, the first power supply is a power supply with an output voltage of 12 V, the second power supply is a power supply with an output voltage of 54 V, the first voltage is 12 V, the second voltage is 54 V and the third voltage is 3.3 V.

In some implementations, the server power supplying method further includes:

adding a first foolproof slot to a housing of the first power supply, and adding a first foolproof column corresponding to the first foolproof slot to a server chassis.

In some implementations, the server power supplying method further includes:

adding a second foolproof slot to a housing of the second power supply, and adding a second foolproof column corresponding to the second foolproof slot to the server chassis.

Figure 4:
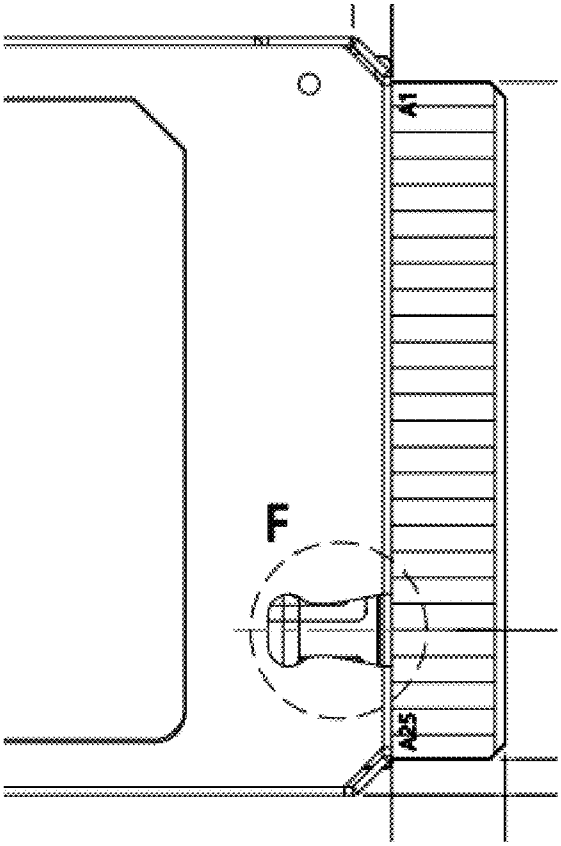
FIG. 4 is a schematic structural diagram of an embodiment of a foolproof slot of a power supply according to the present application.

As shown in FIG. 4, which is a schematic structural diagram of a foolproof slot of a power supply.

In the mechanical design, a foolproof slot design is added, a gourd-shaped hole is added in the structure, and a foolproof column is added on the whole chassis; moreover, the foolproof columns of the 12 V power supply and the 54 V power supply have a certain position difference. In this way, a first level of foolproof is achieved, which may effectively prevent the mixed insertion of the 12 V power supply and the 54 V power supply, so that the 12 V power supply cannot be inserted when it is inserted into the slot where the 54 V power supply is located. Similarly, the 54 V power supply cannot be inserted when it is inserted into the slot where the 12 V power supply is located, a first level of physical foolproof is achieved.

In the above solution, by mechanical foolproof, the problem of mixed insertion of the 12 V power supply and the 54 V power supply is prevented.

In some implementations, the configuring the power supply enable signal of the first power supply includes:

configuring the power supply enable signal of the first power supply to be active high; and as opposed to the configuring the power supply enable signal of the first power supply to be active high, the configuring the power supply enable signal of the second power supply includes: configuring the power supply enable signal of the second power supply to be active low.

In some implementations, the server power supplying method further includes:

connecting each of the first power supply and the second power supply to a corresponding server card through a connector.

In some implementations, the second device includes at least one of a fan and a graphics processing unit.

The first device includes at least one of a central processing unit (CPU), a baseboard management controller (BMC) and a memory.

Figure 5:
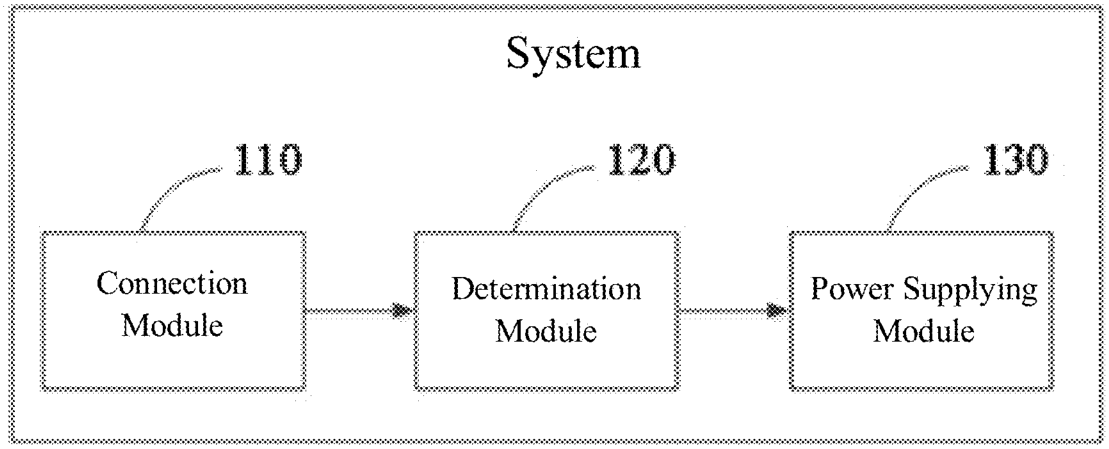
FIG. 5 is a schematic diagram of an embodiment of a server power supplying system according to the present application.

Based on the same inventive concept, according to another aspect of the present application, as shown in FIG. 5, an embodiment of the present application further provides a server power supplying system, including:

a connection module 110 configured to connect a first device in a server system based on a first power supply and connect a second device in the server system based on a second power supply, wherein the first power supply and the second power supply are electric power supplies of the server system;

a determination module 120 configured to after the server system is powered on, acquire power supply information of the server system and determine the power supply information; and a power supplying module 130 configured to in response to the power supply information being first power supply information, configure a power supply enable signal of the first power supply to enable the first power supply to supply power to the first device in the server system based on the power supply enable signal of the first power supply;

the power supplying module 130 being further configured to in response to the power supply information being second power supply information, configure a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply.

In the above solution, devices with different power supplying requirements in the server system are supplied with power via the first power supply and the second power supply; the power supply enable signals of the first power supply and the second power supply are correspondingly configured, so that the respective corresponding devices are supplied with power by the first power supply and the second power supply under the condition that the respective enable signals are valid, thereby hybrid power supplying of the two power supplies in the server system is achieved, the power supplying efficiency of the server system is improved, and by configuring the power supply enable signals of the two power supplies, the electrical foolproof of the server system is realized.

In some implementations, the system further includes a timing control module; the timing control module is configured to:

enable the power supply enable signal of the second power supply based on a complex programmable logic device to enable the second power supply to output a second voltage; and after the second power supply outputs the second voltage for a preset time, enabling the power supply enable signal of the first power supply based on a metal-oxide-semiconductor field-effect transistor to enable the first power supply to output a first voltage.

Figure 6:
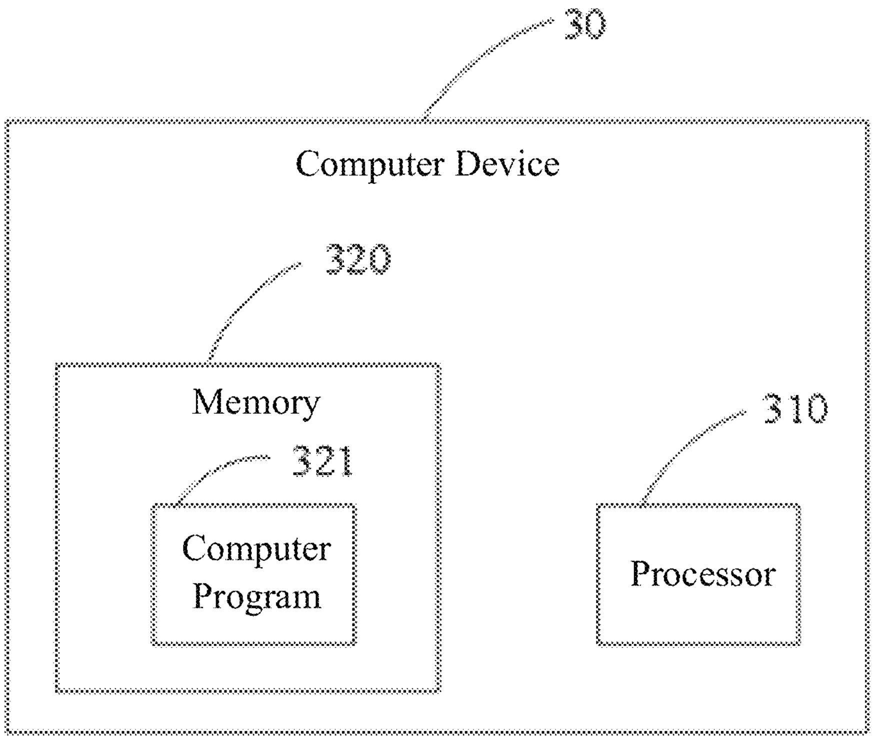
FIG. 6 is a schematic structural diagram of an embodiment of a computer device according to the present application.

Based on the same inventive concept, according to another aspect of the present application, as shown in FIG. 6, a computer device 30 is further provided by an embodiment of the present application; the computer device 30 includes a processor 310 and a memory 320, the memory 320 stores computer programs 321 operable on the processor, and the processor 310, when executing the programs, performs steps of the above method.

The memory, as a computer non-transitory readable storage medium, may be configured to store non-transitory software programs, non-transitory computer-executable programs and modules, such as program instructions/modules corresponding to the server power supplying method in the embodiment of the present application. The processor executes various functional applications of the apparatus and data processing, that is, implementing the server power supplying method of the above method embodiment, by executing the non-transitory software programs, instructions, and modules stored in the memory.

The memory may include a storage program area and a storage data area, wherein the storage program area may store an operating system, an application program required by at least one function, and the like, and the storage data area may store data created according to the use of the apparatus, and the like. In addition, the memory may include a high-speed random-access memory, and may also include a non-transitory memory, for example, at least one magnetic disc storage device, a flash device, or other non-transitory solid-state storage device. In some implementations, the memory includes remotely-disposed memories concerning the processor; these remote memories may be connected to the local module via a network. Examples of the above networks include, but are not limited to, the Internet, intranets, local area networks, mobile communication networks, and combinations thereof.

In one or more exemplary designs, the functions may be implemented in hardware, software, firmware, or any combination thereof. If implemented in software, the functions may be stored on or transmitted over as one or more instructions or code stored on computer-readable media. Computer-readable media includes computer storage media and communication media, the communication media includes any medium that facilitates the transfer of computer programs from one place to another. The storage medium may be any available medium that may be accessed by a general-purpose or special-purpose computer. By way of example, and not limitation, the computer-readable media may include random-access memory (RAM), read-only memory (ROM), electrically erasable programmable read-only memory (EEPROM), compact disc read-only memory (CD-ROM); or other optical disc storage device, magnetic disc storage device, or other magnetic storage devices, or any other medium that may be used to carry or store desired program code in the form of instructions or data structures that may be accessed by a general-purpose or special-purpose computer or a general-purpose or special-purpose processor. Moreover, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio and microwave, the coaxial cable, fiber optic cable, twisted pair. DSL, or wireless technologies such as infrared, radio, and microwave are included in the definition of the medium. The magnetic disc and optical disc, as used herein, include compact disc (CD), laser disc, magneto-optical disc (MO disc), digital versatile disc (DVD), floppy disc, and Blu-ray disc (BD), wherein the magnetic discs usually reproduce data magnetically, and the optical discs reproduce data optically by using lasers. Combinations of the above content should also be included within the scope of the computer-readable media.

Figure 7:
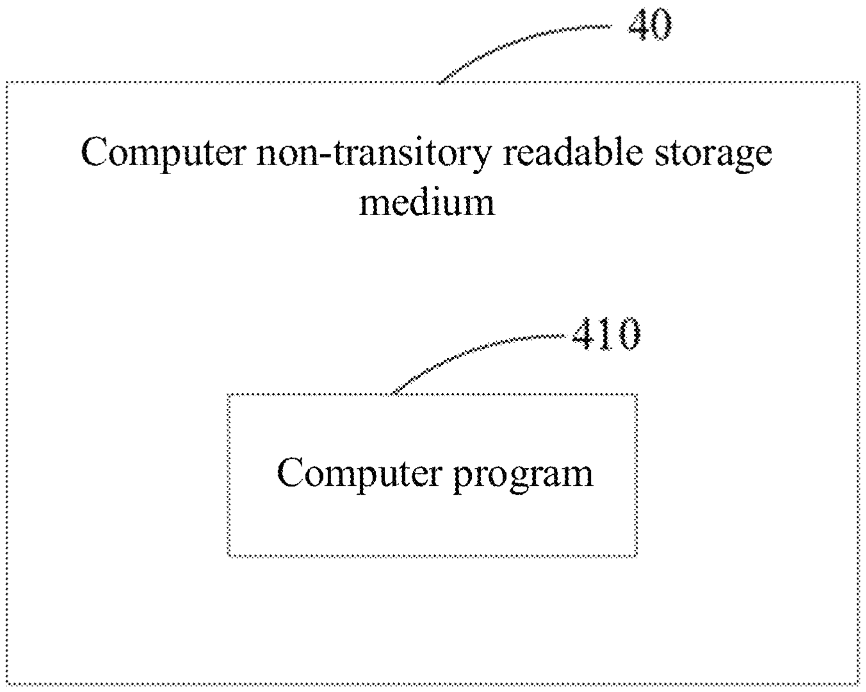
FIG. 7 is a schematic structural diagram of an embodiment of a computer non-transitory readable storage medium according to the present application.

Based on the same inventive concept, according to another aspect of the present application, as shown in FIG. 7, a computer non-transitory readable storage medium 40 is further provided by an embodiment of the present application, the computer non-transitory readable storage medium 40) storing computer programs 410 that, when executed by a processor, perform the above method.

Finally, it should be noted that a person skilled in the art may understand that all or part of the flow of the methods of the embodiments described above may be implemented by computer programs instructing the associated hardware, and the programs may be stored in a computer-readable storage medium and may include the flows of the embodiments of the methods described above when the programs are executed. The storage medium of the programs may be a magnetic disc, an optical disc, a ROM, a RAM, or the like. Embodiments of the above computer programs may achieve the same or similar effects as any of the above method embodiments corresponding thereto.

A person skilled in the art may further appreciate that the various exemplary logical blocks, modules, circuits, and algorithm steps described in combination with the disclosure herein may be implemented as electronic hardware, computer software, or combinations of both. In order to clearly illustrate the interchangeability of hardware and software, various illustrative assemblies, blocks, modules, circuits, and steps have been described generally in terms of their functionality. Whether this functionality is implemented as software or hardware depends upon the application and design constraints applied to the overall system. A person skilled in the art may implement the described functionality in various ways for each application, but the implementation decisions should not be interpreted as causing a departure from the disclosed scope of the embodiments of the present application.

The foregoing are exemplary embodiments disclosed in the present application, but it should be noted that various changes and modifications could be made without departing from the disclosed scope of the embodiments of the present application as defined by the claims. The functions, steps, and/or actions of the method claims according to the disclosed embodiments described herein need not be performed in any particular order. The above embodiments of the present application disclose the serial numbers of the embodiments only for description and do not represent the advantages and disadvantages of the embodiments. Furthermore, although elements disclosed in the embodiments of the present application may be described or claimed in the singular, the plural is contemplated unless limitation to the singular is explicitly limited.

It should be understood that, as used herein, the singular forms "a", "an", and "the" are intended to include the plural forms as well, unless the context clearly supports an exceptional case. It should also be understood that "and/or", as used herein, includes any or all possible combinations of one or more of the associated listed items.

A person skilled in the art should understand that the discussion on any of the above embodiments is merely illustrative, and are not intended to imply that the scope (including the claims) of the embodiments of the present disclosure is limited to those examples. With the concept of the embodiments of the present application, the embodiments or the technical features of different embodiments may be combined, and many other variations of different aspects of the embodiments of the present disclosure as stated above may exist, which are not provided in detail for brevity. Therefore, any omissions, modifications, equivalent substitutions and improvements that are made within the spirit and the principle of the embodiments of the present disclosure should fall within the protection scope of the embodiments of the present disclosure.

The invention claimed is:

1. A server power supplying method, comprising:

connecting a first device in a server system based on a first power supply, and connecting a second device in the server system based on a second power supply, wherein the first power supply and the second power supply are electric power supplies of the server system;

after the server system is powered on, acquiring power supply information of the server system and determining the power supply information;

in response to the power supply information being first power supply information, configuring a power supply enable signal of the first power supply to enable the first power supply to supply power to the first device in the server system based on the power supply enable signal of the first power supply; and in response to the power supply information being second power supply information, configuring a power supply enable signal of the second power supply to enable the second power supply to supply power to the second device in the server system based on the power supply enable signal of the second power supply, wherein the power supply enable signal of the first power supply is configured to be opposite to the power supply enable signal of the second power supply;

wherein the server power supplying method further comprises:

enabling the power supply enable signal of the second power supply based on a complex programmable logic device to enable the second power supply to output a second voltage; and after the second power supply outputs the second voltage for a preset time, enabling the power supply enable signal of the first power supply based on a metal-oxide-semiconductor field-effect transistor to enable the first power supply to output a first voltage;

the enabling the power supply enable signal of the first power supply based on the metal-oxide-semiconductor field-effect transistor comprises:

obtaining a third voltage by dividing the second voltage; and regarding the third voltage as an enable signal of the metal-oxide-semiconductor field-effect transistor to enable the metal-oxide-semiconductor field-effect transistor to output a low level to the first power supply to enable the power supply enable signal of the first power supply;

wherein the first power supply is a power supply with an output voltage of 12 V, the second power supply is a power supply with an output voltage of 54 V, the first voltage is 12 V, the second voltage is 54 V, and the third voltage is 3.3 V.

2. The server power supplying method according to claim 1, wherein the configuring the power supply enable signal of the first power supply comprises:

configuring the power supply enable signal of the first power supply to be active low; and as opposed to the configuring the power supply enable signal of the first power supply to be active low, the configuring the power supply enable signal of the second power supply comprises: configuring the power supply enable signal of the second power supply to be active high.

3. The server power supplying method according to claim 1, wherein the enabling the power supply enable signal of the second power supply based on the complex programmable logic device comprises:

outputting a high level to the second power supply based on the complex programmable logic device to enable the power supply enable signal of the second power supply.

4. The server power supplying method according to claim 1, wherein the server power supplying method further comprises:

adding a first foolproof slot to a housing of the first power supply, and adding a first foolproof column corresponding to the first foolproof slot to a server chassis.

5. The server power supplying method according to claim 4, wherein the server power supplying method further comprises:

adding a second foolproof slot to a housing of the second power supply, and adding a second foolproof column corresponding to the second foolproof slot to the server chassis.

6. The server power supplying method according to claim 5, wherein the first foolproof column and the second foolproof column have a position difference on the server chassis.

7. The server power supplying method according to claim 5, wherein the first foolproof slot and the second foolproof slot are gourd-shaped holes.

8. The server power supplying method according to claim 1, wherein the configuring the power supply enable signal of the first power supply comprises:

configuring the power supply enable signal of the first power supply to be active high; and as opposed to the configuring the power supply enable signal of the first power supply to be active high, the configuring the power supply enable signal of the second power supply comprises: configuring the power supply enable signal of the second power supply to be active low.

9. The server power supplying method according to claim 1, wherein the server power supplying method further comprises:

connecting each of the first power supply and the second power supply to a corresponding server card through a connector.

10. The server power supplying method according to claim 1, wherein the second device comprises a graphics processing unit; and the first device comprises at least one of a central processing unit, a baseboard management controller and a memory.

11. The method according to claim 8, wherein the second device further comprises a fan.

12. The server power supplying method according to claim 1, wherein a quantity of the first power supply is at least one, and a quantity of the second power supply is at least one.

13. The server power supplying method according to claim 1, wherein an enable signal of a pin in a gold finger end of the first power supply is the power supply enable signal of the first power supply; and an enable signal of a pin in a gold finger end of the second power supply is the power supply enable signal of the second power supply.

14. A computer device, comprising:

at least one processor; and a memory storing computer programs executable on each of the at least one processor, wherein each of the at least one processor, in response to executing the computer programs, performs the steps of the server power supplying method according to claim 1.

15. A computer non-transitory readable storage medium storing computer programs wherein in response to the computer programs being executed by a processor, the steps of the server power supplying method according to claim 1 are performed.

16. The server power supplying method according to claim 1, wherein the output voltage of 54 V is output before the output voltage of 12 V is output.

17. The computer device according to claim 14, wherein the operation of configuring the power supply enable signal of the first power supply comprises:

configuring the power supply enable signal of the first power supply to be active low; and as opposed to the configuring the power supply enable signal of the first power supply to be active low, the configuring the power supply enable signal of the second power supply comprises: configuring the power supply enable signal of the second power supply to be active high.

* * * * *